(No Model.)
S. RAY.
DRAFT EQUALIZER.
No. 298,622. Patented May 13, 1884.
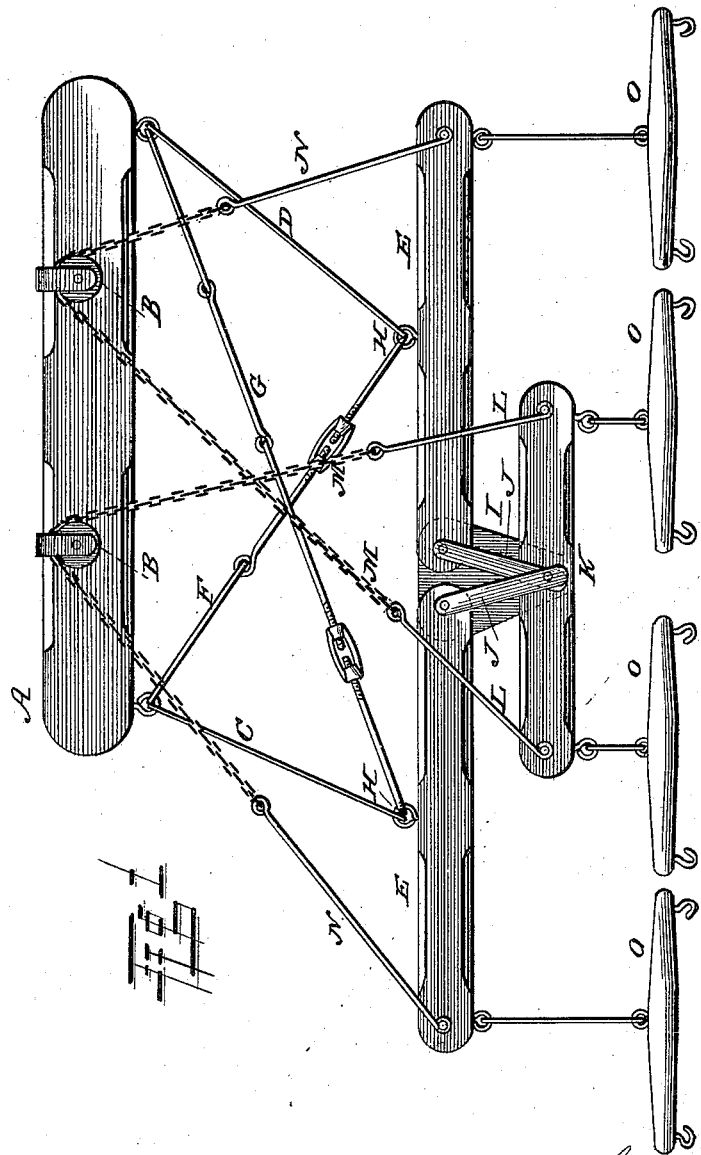
WITNESSES:
Samuel Ray,
INVENTOR.
By Louis Bagger & Co,
ATTORNEYS.

UNITED STATES PATENT OFFICE.

SAMUEL RAY, OF OREGON, ILLINOIS.

DRAFT-EQUALIZER.

SPECIFICATION forming part of Letters Patent No. 298,622, dated May 13, 1884.

Application filed March 3, 1884. (No model.)

*To all whom it may concern:*

Be it known that I, SAMUEL RAY, a citizen of the United States, and a resident of Oregon, in the county of Ogle and State of Illinois, have invented certain new and useful Improvements in Horse-Eveners; and I do hereby declare that the following is a full, clear, and exact description of the invention, which will enable others skilled in the art to which it appertains to make and use the same, reference being had to the accompanying drawing, which forms a part of this specification, and which shows a top view of my improved four-horse draft-equalizer.

My invention has relation to four-horse draft-equalizers; and it consists in the improved construction and combination of parts of the same, as hereinafter more fully described and claimed.

In the accompanying drawing, which shows a plan view, the letter A indicates a cross-bar or double-tree, which is attached at its middle to the implement or vehicle which is to be propelled, and which has upon its upper side two pulleys, B, pivoted to turn in a horizontal plane.

Two rods, C and D, are hinged at their inner ends to the ends of the cross-bar, and have two double-trees, E E, hinged at their forward ends, the rods extending obliquely to one side, throwing the line of draft to one side in such a manner that one horse will be at one side of the straight line of draft, while the three other horses are at the other side of the same, and two cross-rods, F and G, are hinged at their inner ends at the ends of the cross-bar, and at their outer ends to the eyes H upon the middle of the double-trees, upon which the said double-trees are hinged to the ends of the oblique rods, the said rods crossing each other and serving to hold the oblique rods and the double-trees in their positions to each other. The inner ends of the double-trees are hinged to the rear corners of a triangular plate, I, upon their under sides, and to the rear ends of two bars, J, upon their upper sides, and a double-tree, K, is hinged upon its under side to the forward end of the plate, and upon its upper side to the forward ends of the arms, the same bolts serving to hinge the plate and the arms.

Rods L L are hinged to the outer ends of the inner double-trees, and have chains M M hinged to their rear ends, which chains pass over the pulleys upon the inner cross-piece, and are hinged to the rear ends of rods N N, hinged at their forward ends to the ends of the forward double-tree, and single-trees O are hinged to the outer ends of the inner double-trees and to the ends of the forward double-tree.

It will be seen that the draft of the animals upon the single-trees hinged to the ends of the inner or rear double-trees will be exerted upon the rods and chains attached to the ends of the said double-trees, and the chains passing over the pulleys and being attached to the ends of the forward double-tree, crossing each other, the draft of the animals upon the middle single-trees will counterbalance the draft of the animals attached to the outer single-trees, every other animal pulling against each other. It will also be seen that the direct draft upon the ends of the rear double-trees will be counterbalanced by the united draft of the two middle animals upon the forward double-tree by means of the triangular plate and the arms, the outer animals thus pulling in unison against the middle animals at the same time as the outer animals pull separately against their respective companion or mate in the middle; and it will be seen that the draft, acting obliquely upon the rods upon which the inner double-trees are hinged or pivoted, will be converted by the inner cross-bar to a direct and straight draft upon the tongue, or upon whatever connection it may have with the implement or vehicle to be propelled.

Having thus described my invention, I claim and desire to secure by Letters Patent of the United States—

In a four-horse draft-equalizer, the combination of the cross-bar attached to the vehicle, and having two pulleys upon its side, the oblique rods hinged to the ends of the cross-bar, the oblique rods attached to the ends of the cross-bar and crossing each other, the inner double-trees hinged or pivoted upon the ends of the oblique bars, the triangular plate and the arms hinged to the inner ends of the inner double-trees, the forward double-tree hinged upon the forward point of the triangular plate and upon the ends of the arms, the chains and rods attached to the outer ends of the inner double-trees and to the ends of the forward double-tree, and the single-trees attached to the ends of the double-trees, all constructed and arranged as and for the purpose shown and set forth.

In testimony that I claim the foregoing as my own I have hereunto affixed my signature in presence of two witnesses.

SAMUEL RAY.

Witnesses:
WILLIS C. BUNKER,
CLARENCE A. ANDERSON.